(12) United States Patent
Morin et al.

(10) Patent No.: US 7,981,369 B2
(45) Date of Patent: Jul. 19, 2011

(54) PLANT FOR THE GENERATION OF ELECTRICITY

(75) Inventors: Jean-Xavier Morin, Neuville Aux Bois (FR); Silvestre Suraniti, Aix En Provence (FR); Corinne Beal, Voisins le Bretonneux (FR)

(73) Assignee: Alstom Technology Ltd, Baden (CH)

( * ) Notice: Subject to any disclaimer, the term of this patent is extended or adjusted under 35 U.S.C. 154(b) by 186 days.

(21) Appl. No.: 12/210,757

(22) Filed: Sep. 15, 2008

(65) Prior Publication Data
US 2009/0072538 A1 Mar. 19, 2009

Related U.S. Application Data

(63) Continuation of application No. PCT/EP2007/051951, filed on Mar. 1, 2007.

(30) Foreign Application Priority Data

Mar. 16, 2006 (FR) ...................................... 06 50885

(51) Int. Cl.
*B01J 8/18* (2006.01)
*C01G 53/04* (2006.01)

(52) U.S. Cl. ..................................... 422/142; 423/594.3

(58) Field of Classification Search .................... 60/772, 60/39.464, 39.465, 781, 39.12; 439/594.3, 439/594.4; 55/345–349, 459.1; 422/141, 422/142, 144, 147, 630, 631
See application file for complete search history.

(56) References Cited

U.S. PATENT DOCUMENTS

| 3,969,089 | A | | 7/1976 | Moss et al. |
| 4,273,749 | A | * | 6/1981 | Kimura et al. ................. 423/231 |
| 4,898,107 | A | * | 2/1990 | Dickinson ..................... 110/346 |
| 5,083,862 | A | * | 1/1992 | Rusnak ....................... 356/239.1 |
| 5,526,582 | A | * | 6/1996 | Isaksson .......................... 34/476 |
| 6,494,153 | B1 | * | 12/2002 | Lyon ............................. 110/345 |
| 6,505,567 | B1 | | 1/2003 | Liljedahl et al. |
| 6,572,761 | B2 | | 6/2003 | Lyon |
| 2003/0194356 | A1 | * | 10/2003 | Meier et al. ................... 422/141 |
| 2009/0000194 | A1 | * | 1/2009 | Fan et al. .................... 48/199 R |

FOREIGN PATENT DOCUMENTS

| FR | 0300432 | 8/2003 |
| FR | 2850156 | 7/2004 |
| WO | WO-9902471 | 1/1999 |
| WO | WO-2005124232 | 12/2005 |

* cited by examiner

Primary Examiner — Michael Cuff
Assistant Examiner — Gerald L Sung
(74) Attorney, Agent, or Firm — Leydig, Voit & Mayer, Ltd.

(57) ABSTRACT

A plant for generating electricity includes a gas turbine, a compressor driven by the gas turbine, a reduction reactor configured to reduce metal oxides, fed with a fuel and having a first circulating fluidized bed, a first cyclone configured to separate the metal oxide solids, and feeding at least a portion of the metal oxide solids to the reduction reactor via a first connecting line, an oxidation reactor configured to oxidize the metal oxides having a second circulating fluidized bed and fed only with pressurized air from the compressor, and a second cyclone configured to separate the metal oxide solids and feeding at least a portion of the metal oxide solids to the oxidation reactor via a second connecting line.

9 Claims, 1 Drawing Sheet

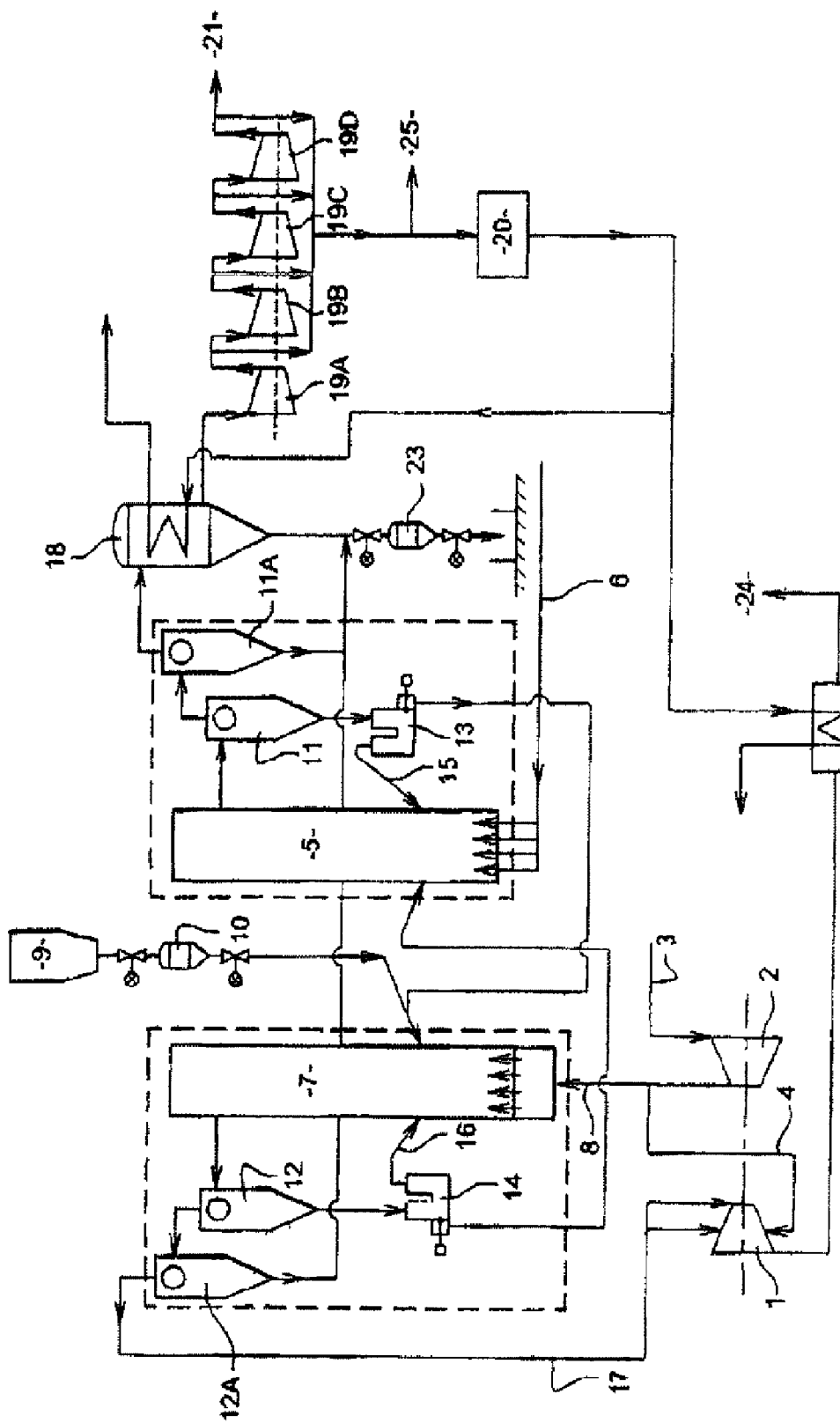
Figure

PLANT FOR THE GENERATION OF ELECTRICITY

CROSS REFERENCE TO PRIOR APPLICATIONS

This application is a continuation International Patent Application No. PCT/EP2007/051951, filed on Mar. 1, 2007 and published in the German language on Sep. 20, 2007 as WO 2007/104655, which claims priority to French Patent Application No. FR 06/50885, filed on Mar. 16, 2006. The entire disclosure of both applications is incorporated by reference herein.

The present invention relates to a plant for the generation of electricity that includes a gas turbine assigned to a system for combustion by a thermochemical cycle in which metal oxides are alternately oxidized and reduced by oxygen transport being ensured, and including a reduction chamber fed with fuel and an oxidation chamber fed with air.

BACKGROUND

It is known from patent document FR 03 00 432 to realize combustion by a thermochemical cycle in which metal oxides are alternately oxidized and reduced by oxygen transport to a gaseous or solid fuel therefore being ensured. This system is designed in such a way that it functions at atmospheric pressure and has means for the recovery of heat for the generation of steam, which is subsequently expanded in a steam turbine for the generation of electricity. This system functions at temperatures of the thermochemical cycle which are between 750 and 950° C.

U.S. Pat. No. 6,572,761 in turn describes a system for combustion by a thermochemical cycle in which metal oxides, preferably iron oxides, are alternately oxidized and reduced by oxygen transport to a solid fuel therefore being ensured, said oxygen transport containing ash and sulfur such as coal, in order to serve as a combustion chamber for a gas turbine.

These iron oxides circulate between two combustion chambers and are reduced by the solid fuel in the first chamber and are oxidized by the air in the second chamber. The temperature is controlled in the second chamber by the use of natural gas or a suitable fuel and the percentage of the addition of solid fuel to the second chamber is controlled in order to limit the quantity of sulfur dioxide in the gases which leave the second chamber. The term "suitable fuel" means a fuel which meets the current regulations.

SUMMARY OF THE INVENTION

In the system described above, two fuels are used in this combustion system: a solid fuel in the first chamber and natural gas or a suitable fuel in the second chamber. This use of fuels unavoidably leads to production of carbon dioxide in the smoke of the two chambers.

The carbon dioxide is a gas with greenhouse effect, an object of emission limitation, thereby resulting in a desire to completely or partly capture this dioxide.

The present invention provides a plant for the generation of electricity that includes a gas turbine equipped with a compressor and fed with gas by a combustion system with a thermochemical cycle in which metal oxides are alternately oxidized and reduced by oxygen transport being ensured, and including a reduction chamber fed with fuel, and an oxidation chamber fed with air under pressure delivered by the compressor of the turbine. The oxidation chamber is fed with air and the chambers are reactors having a circulating fluidized bed and are each equipped with a cyclone for the separation of solids. The cyclone includes a line for reintroducing at least a first portion of these solids into the corresponding reactor, which means that no additional fuel has to be directed into the oxidation chamber and consequently enables the production of carbon dioxide in the oxidation chamber to be avoided. Thus, a thermochemical cycle permits advantageous capture of carbon dioxide.

Each reactor having a circulating fluidized bed has a recirculation loop for solids, from which recirculation loop a fraction of solids is removed, in order to feed the other reactor enables the hydrodynamic functions of the two reactors to be isolated to a certain degree.

A simple and compact plant is realized.

In addition, the crude-oil production fields produce associated quantities of natural gas which are often burned in a flare or are simply diverted into the atmosphere. These two methods produce especially harmful gas emissions with greenhouse effect.

The generation of electricity from natural gas is mainly based on the use of a gas turbine which operates with an excess air factor that is higher than two, which has the effect of considerably rarefying the carbon dioxide originating from the combustion, such that this carbon dioxide often constitutes 5% by volume of the emitted smoke leaving the turbine.

Although the combined cycles often enable 58% efficiency of the cycle to be achieved, this emission of carbon dioxide remains very high in face of the requirements for the complete capture of the emitted carbon dioxide for the purposes of storage or of the assisted recovery of crude-oil and natural-gas fields.

According to a preferred embodiment, the invention also proposes to use natural gas or crude oil fractions for the generation of electricity with the recovery of carbon dioxide, while a gas turbine which offers an optimum thermodynamic efficiency is used.

According to this preferred embodiment, the fuel is natural gas and crude oil fractions.

Due to the invention, the energy loss is minimal, since very pure carbon dioxide is produced in the reduction chamber and this carbon dioxide is already in the compressed state, which limits the degree of compression, in order to achieve the final state of the carbon dioxide for transport purposes.

At least one of the separating cyclones is advantageously equipped with at least one supplementary cyclone for the separation of solids.

Consequently, driven dedusting of the depleted air at the outlet of the oxidation reactor can be ensured in order not to damage the blades of the turbine. Likewise, driven dedusting of the carbon dioxide at the outlet of the reduction reactor can be ensured in order not to damage the blades of a line of compressors which ensure the handling and the processing of this carbon dioxide.

Each subassembly which is formed from a reactor equipped with a cyclone and possibly a supplementary cyclone is advantageously made refractory.

Each subassembly formed from a reactor equipped with a cyclone and possibly a supplementary cyclone can be fitted in an enclosure under pressure.

The gas turbine is preferably a turbine having two expansion stages.

The invention also relates to a method for the generation of electricity by means of a plant as precisely specified above, the operating temperature in the oxidation reactor being in the order of magnitude of 1200° C. This temperature forms the maximum admissible temperature for the cooled blades of a gas turbine in view of the existing materials.

The operating temperature in the reduction reactor is preferably lower than that of the oxidation reactor by 100 to 200° C.

The metal oxides are advantageously mixed oxides which contain nickel.

BRIEF DESCRIPTION OF THE DRAWING

The invention is described in more detail below with reference to the drawing, in which:

The FIGURE shows a preferred embodiment of an installation according to the invention.

DETAILED DESCRIPTION

According to the present invention, a plant for the generation of electricity comprises a gas turbine 1 which is equipped with a compressor 2 and is fed with a gas by a combustion system with a thermochemical cycle in which metal oxides having an increased melting point, preferably mixed oxides which contain nickel, for example nickel oxides on an aluminum basis, are alternately oxidized and reduced by oxygen transport being ensured.

The compressor 2 is fed with air by a supply line 3 and it releases compressed air at the outlet at a pressure of between 25 and 40 bar, said compressed air being directed into the combustion system, some of this air additionally being used for cooling the blades of the turbine through a line 4.

The combustion system comprises a reduction chamber 5, which is fed with fuel consisting of natural gas or crude oil fractions, by incoming fuel 6 fed to injectors arranged at the base of the chamber, and an oxidation chamber 7, which is fed with air which is delivered by the compressor 2 of the turbine via an inlet line 8.

The thermochemical cycle is realized by introduction of metal oxides into the oxidation chamber 7 from a silo 9 by means of a controllable discontinuous sluice 10.

These chambers 5, 7 are reactors having a circulating fluidized bed, which are each equipped with a cyclone 11, 12 for the separation of solids, said cyclone 11, 12 being provided with a line 15, 16 for reintroducing a first portion of these solids into the corresponding reactor through a siphon 13, 14.

At the outlet of the siphon 14 which is assigned to the oxidation reactor 7, where the oxidation of the metal oxides is effected at a temperature of approximately 1200° C., a second portion of the solids which comprise the oxidized metal oxides is directed into the reduction reactor 5, the operating temperature of which is lower than that of the oxidation reactor by 100 to 200° C., i.e. is in the order of magnitude of 1000 to 1100° C.; and at the outlet of the siphon 13 which is assigned to the reduction reactor 5, a second portion of solids with reduced metal oxides is directed into the oxidation reactor 7. Therefore the thermochemical cycle is realized by oxygen transport between the two reactors.

At least one of the separating cyclones 11, 12 is equipped with at least one further cyclone for the separation of the solids.

To be more precise, according to the preferred embodiment, the cyclone 12 with which the oxidation reactor 7 is equipped is connected at the top part to a supplementary cyclone 12A for separating the solids, said cyclone 12A delivering, at the gaseous discharge, oxygen-depleted air which contains dust below 5 ppm with particles of a diameter below 5 micrometers and is directed into the two stages of the turbine 1 through an inlet passage 17. Some of the depleted air may possibly be directed into the turbine upstream of the second expansion stage in order to increase the efficiency of the turbine.

This inlet passage 17 for connection between the supplementary cyclone 12A, which is assigned to the oxidation reactor, and the turbine 1 is realized in such a way as to be as short as possible, and to this end the gas turbine 1 is physically installed as close to this supplementary cyclone 12A as possible, in contrast to the illustration of the figure, which is intended to show the plant with regard to its mode of operation and not with regard to its physical installation.

In addition, this inlet line 17 comprises two concentric envelopes, in which the hot air, at 1200° C., which leaves the supplementary cyclone 12B is located in the central envelope and a cold fluid is circulated in the annular space between the two envelopes. The cold fluid used may advantageously be the air which is delivered from the compressor 2 via the inlet line 8.

The cyclone 11 with which the reduction reactor 5 is equipped is also connected at the top part to a supplementary cyclone 11A for separating solids, whose gaseous discharge containing high-temperature carbon dioxide which contains dust below 5 ppm with particles of a diameter below 5 micrometers is cooled in a cooler 18, and whose solid discharge, with the solids which leave the supplementary cyclones 11A and 12A assigned to the reactors and those which leave the cooler 18, is drawn off via a controllable discontinuous sluice 23.

Each subassembly which is formed from a reactor 5, 7 which is equipped with a cyclone and a supplementary cyclone is made refractory in order to suppress any loss of energy in the reduction reactor. In addition, these subassemblies are preferably installed in an enclosure under pressure in order to separate the energy function and the pressure-holding function.

At the outlet of the cooler 18, the gas is directed into a system for treating and processing the carbon dioxide, said system consisting of a line of compressors 19A to 19D which ensure compression up to 150 bar, where the gas is stored at the output 21. The water recovered from this line of compressors is partly drawn off for use 25 for the assisted recovery of crude oil and is partly treated in a treatment device 20.

At the outlet of the turbine 1, the depleted expanded air at a temperature of about 600° C. is directed into a boiler 22 for the recovery of heat at three pressure levels, this boiler enabling said air to be cooled down to 90° C. before it is delivered into the atmosphere at 24.

This boiler for the recovery of heat is fed with water from a treatment device 20 which also feeds the cooler 18.

What is claimed is:

1. A plant for generating electricity, comprising:
a gas turbine;
a compressor driven by the gas turbine;
a reduction reactor configured to reduce metal oxides solids, the reduction reactor being fed with a fuel and the metal oxide solids via separate inlets so as to form a first circulating fluidized bed, wherein the metal oxides solids are mixed metal oxide solids that contain nickel;
a first cyclone configured to separate the metal oxide solids, the first cyclone feeding at least a portion of the metal oxide solids to the reduction reactor via a first connecting line;
an oxidation reactor configured to oxidize the metal oxide solids having a second circulating fluidized bed, wherein the oxidation reactor is fed with pressurized air from the compressor; and a second cyclone configured to separate the metal oxide solids, the second cyclone feeding at least a portion of the metal oxide solids to the oxidation reactor via a second connecting line.

2. The plant as recited in claim 1, wherein the fuel includes at least one of natural gas and crude oil fractions.

3. The plant as recited in claim 1, further comprising at least one supplementary cyclone associated with one of the first and second cyclones.

4. The plant as recited in claim 1, wherein the reduction reactor, the oxidation reactor and the first and second cyclones are refractory.

5. The plant as recited in claim 1, further comprising a pressurized enclosure, wherein at least one of the reduction reactor with the first cyclone, and the oxidation reactor with the second cyclone are enclosed within the pressurized enclosure.

6. The plant as recited in claim 1, wherein the gas turbine has two expansion stages.

7. A method of generating electricity, the method comprising: compressing air using a compressor associated with a gas turbine so as to provide pressurized air: reducing metal oxide solids in a reduction reactor fed with fuel and the metal oxide solids via separate inlets so as to form a first fluidized bed, wherein the metal oxide solids are mixed metal oxide solids that contain nickel; separating the metal oxide solids using a first cyclone and feeding at least a portion of the metal oxide solids to the reduction reactor; feeding the pressurized air from the compressor to an oxidation reactor; oxidizing the metal oxide solids using the oxidation reactor having a second circulating fluidized bed, wherein the oxidation reactor receives the pressurized air from the compressor and operates at a temperature of approximately 1200° C.; and separating the metal oxide solids in a second cyclone and feeding at least a portion of the metal oxide solids to the oxidation reactor.

8. The method as recited in claim 7, wherein the reduction chamber operates at a temperature 100 to 200° C. lower than the temperature of the oxidation reactor.

9. The method as recited in claim 7, wherein the metal oxides are mixed oxides that contain nickel.

* * * * *